second lift arm, whereby rotation of said hydraulic motor causes rotation of each of said dual lift arms.

2. The waste body of claim 1 where said bucket further comprises rollers mounted on each side of said bucket, said rollers adapted for horizontally restraining said bucket between said vertical track means while rotating within said track means during vertical movement of said bucket.

3. The waste body of claim 2 where said upper and lower lift arm members are secured to said corresponding drive means, to said upper hinge assembly, and to said lower hinge assembly by means including removable retaining rings, whereby said lift arms, said bucket, and said drive means are easily removable by tools alone for repair and maintenance.

4. The waste body of either of claims 1 through 3 where each of said inner door latching and unlatching means comprises an independently controlled fluid chamber mounted below said body floor plate, a door stop mounted to and above said floor plate, a door latch plate adjacent to said inner door, and rotating means connecting said latch plate to said fluid chamber, and means biasing said connecting means, whereby when said fluid chamber is filled, said latch plate is rotated by said connecting means through a slot in said body floor plate to unlatch said inner door, and whereby when said fluid chamber is empty, said bias means and connecting means cause rotation of said latch plate from beneath said floor plate, latching said inner door against said door stop.

5. The waste body of claim 4 further comprising means mounted to said torque tube for stopping rotation of said torque tube, whereby inversion and discharge of waste from said buckets is indicated by an increase in pressure in said hydraulic motor.

* * * * *

United States Patent [19]

Hawkins

[11] Patent Number: 4,981,412

[45] Date of Patent: Jan. 1, 1991

[54] ALL TERRAIN, VARIABLE FULCRUM HAND TRUCK

[76] Inventor: Bruce L. Hawkins, 322 Naco Hwy., Bisbee, Ariz. 85603-9755

[21] Appl. No.: 481,972

[22] Filed: Feb. 20, 1990

[51] Int. Cl.$^5$ .............................................. B62B 1/06
[52] U.S. Cl. ................................... 414/490; 414/454; 414/456; 414/452; 280/47.29; 280/47.27; 280/47.315
[58] Field of Search ............... 414/490, 622, 452, 454, 414/456, 659; 280/47.17, 47.18, 47.29, 47.27, 47.21, 47.23, 47.315

[56] References Cited

U.S. PATENT DOCUMENTS

| | | | |
|---|---|---|---|
| 499,212 | 6/1893 | Coffield . | |
| 1,510,456 | 10/1924 | Cadwalader | 414/454 |
| 1,820,728 | 8/1931 | Calis | 341/624 |
| 2,360,858 | 11/1944 | Ernst | 450/145 |
| 2,447,300 | 7/1948 | Williams | 641/441 |
| 2,635,775 | 4/1953 | Ernst | 80/440 |
| 2,765,090 | 10/1956 | Halls | 414/490 X |
| 3,794,371 | 2/1974 | Arbouw | 294/90 |
| 3,815,767 | 6/1974 | Lund . | |
| 3,998,476 | 12/1976 | Kazmark | 280/47.315 X |
| 4,114,916 | 9/1978 | Oyama | 280/47.29 |
| 4,257,729 | 3/1981 | Morissette | 414/490 |
| 4,429,897 | 2/1984 | Friedman et al. | 280/47.315 X |
| 4,685,713 | 8/1987 | Van der Hulst | 294/90 |
| 4,741,659 | 5/1988 | Berg | 414/450 |
| 4,902,187 | 2/1990 | Rousseau | 414/490 X |

OTHER PUBLICATIONS

Rand Materials Handling Equipment Co., Inc., Catalog 1990-1, pp. 144-145.
Ryerson Wholesale Industrial Catalog. Fall 1989, No. 119, p. 69.

Primary Examiner—Robert J. Spar
Assistant Examiner—Brian Dinicola
Attorney, Agent, or Firm—Antonio R. Durando; Harry M. Weiss

[57] ABSTRACT

A modified hand truck with a novel structure that optimizes the cooperation between the carrying platform and the wheels in order to produce the maximum lifting force possible for the operator. The wheels are free to move in relation to the carrying platform, thus tilting of the load to the extent desired is possible before lifting becomes necessary. In addition, because the invention minimizes the impact of the size of the wheels on the lifting action, large wheels are used to improve the rideability and stability of the truck.

2 Claims, 2 Drawing Sheets

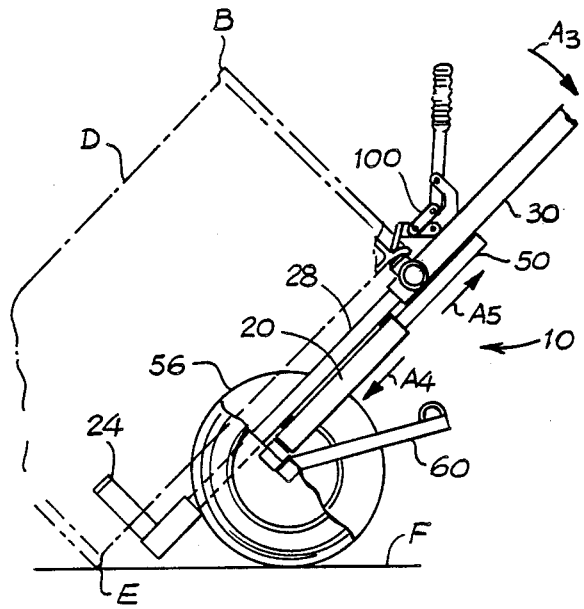

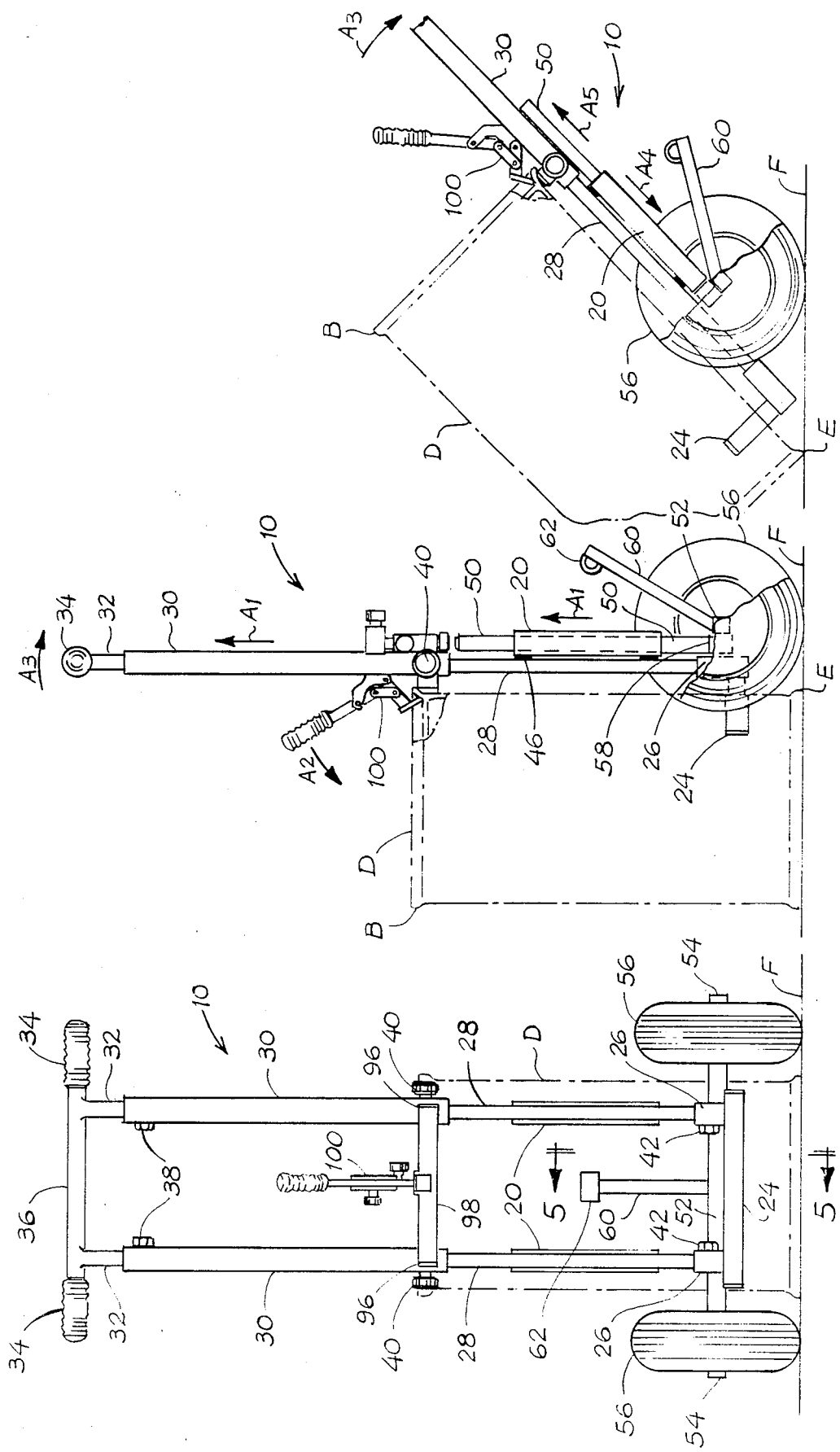

ALL TERRAIN, VARIABLE FULCRUM HAND TRUCK

BACKGROUND OF THE INVENTION

1. Field of the Invention

This invention pertains to the general field of hand trucks used to lift and move heavy weights in warehouses and similar environments. In particular, it provides a new and improved way of lifting and transporting barrels and drums of different sizes over variable terrain conditions.

2. Description of the Prior Art

People have used carts and similar kinds of apparatus to help them move heavy weights ever since the wheel was invented. Similarly, they have strived to develop equipment that makes it easier to secure the weight and load it on the moving device.

Hand trucks, also commonly called dollies, are the type of equipment developed over the years to pick up and move heavy objects within short distances. In principle, they all consist of a platform with a set of wheels at one end and long handles at the other. The weight is secured to the platform while it stands in a generally vertical position with the wheels on the ground; then, the weight can be lifted by pulling on the handles and using the length of the platform as a lever having the axle of the wheels as its fulcrum of leverage.

As early as 1893, in U.S. Pat. No. 499,212, Coffield describes an improved model of hand truck featuring a bottom shoe for holding the object being transported and an adjustable latch for securing it to the platform. These are still the basic features found in a modern all purpose dolly.

In U.S. Pat. No. 1,820,728 (1931), Calis shows a hand truck of different and novel construction, specifically designed for garbage cans and other barrel-shaped objects. The device consists of a single piece frame, two wheels and a load retainer capable of adjustment by sliding along the length of the frame.

U.S. Pat. No. 2,360,858 to Ernst (1944) discloses a piece of equipment for handling drums and comparable objects. Not strictly a dolly, the device consists of a vertical boom rigidly mounted on a horizontal frame on wheels. The boom is equipped with a latch for grabbing the load and a rack and pinion mechanism for raising and lowering it to various elevations.

In U.S. Pat. No. 2,447,300 (1948), Williams describes a device for grasping and holding in place container drums. The invention clamps the top flange of the drum between a hook and a supporting stop and secures the load to the equipment used to move it. Therefore, it is used in combination with hand trucks and elevator trucks as the means for engaging the load to the equipment.

Ernst shows an improved grasp device for hand trucks in U.S. Pat. No. 2,635,775 (1953). It is designed to improve the retention capability of such devices, especially for use on uneven floors, where the probability of failure of the locking mechanism can result from a rough ride and cause dangerous spills. As in Williams' invention, the apparatus is directed primarily to equipment for lifting and transporting barrels and drums. In U.S. Pat. No. 3,794,371 (1974), Arbouw describes a novel drum gripper used to hoist barrels into an upright position. The device is not applied in cooperation with hand or elevator trucks.

U.S. Pat. No. 3,815,767 to Lund et al. (1974) discloses a drum handling device that permits its positioning for optimal drainage. The apparatus consists of a standard dolly with an adjustable gripping mechanism for the chime of the drum; in addition, it features supporting bearings on its frame for rotating the drum for complete drainage while tilted to a near horizontal position. The frame of the dolly also contains members providing an appropriate structure to support the drum in that position.

Morissette, in U.S. Pat. No. 4,257,729 (1981), shows a hand truck for transporting loads without having to tilt them prior to positioning them on the truck. The platform of the dolly is provided with an adjustable clamp to grab the top of the load and with feet that rest on the ground when the dolly is positioned vertically against the object to be moved. While the dolly is in that position, its wheels are slightly elevated from the ground, so that they do not provide immediate support when the handle is pulled toward the operator to load the object on the platform. Rather, the pivotal point remains the bottom edge of the object itself, so that the object can be tilted with the platform, without lifting, until the tilting motion of the platform itself brings its wheels into contact with the ground. At that point, the pivot switches to the axle of the wheels and the object can be lifted after being already positioned on the truck.

U.S. Pat. No. 4,685,713 to Van der Hulst et al. (1987) describes a container grab of general application in hand trucks and elevator devices. The apparatus uses a novel clamping mechanism for container rims and multiple adjustments for holding a load in place.

Berg shows a powered drum lifting truck in U.S. Pat. No. 4,741,659 (1988). It consists essentially of a dolly frame with means for securely grabbing the upper rim of a drum. It also provides a mechanism for lifting the load while attached to the frame of the dolly to allow the operator to deposit it at different elevations.

Finally, various embodiments of the inventions described in these patents are found in current catalogs of material handling equipment. See, for example, Rand's 90-1 Catalogue at pages 144 and 145; and Ryerson's Wholesale Industrial catalog No. 119 at page 69.

The main objective in the operation of a hand truck is the ability of the operator to lift the load and position its weight on the axle of the wheels single-handedly and safely. In order to optimize the force available to the operator, the principle of the lever is used. The hand truck is built with long handles that enable the operator to exert leverage on the load attached to it by pivoting around the wheels' axle. By positioning and securing the frame of the hand truck vertically against the object to be moved, it becomes possible for a single person to lift it by pulling the handles away from the object, thus causing the entire assembly to pivot around the wheels. As a result, a single operator can lift and transport very heavy objects that could not otherwise be moved by one person alone.

The main problem with the hand trucks and similar pieces of equipment described in prior art is that the initial effort required to pull a load away from the ground onto the platform of the dolly is often beyond the ability of the average person. This difficulty is ameliorated by positioning the axle of the wheels as close as possible to the ground and to the load, so that the counterleverage exerted by the weight of the object is minimized. These design characteristics, though, have the negative effect of necessarily resulting in very small wheels which affect the smoothness of ride and the stability of the hand truck. Furthermore, and most importantly with regard to this invention, the do not eliminate the need to actually lift the load from the ground before the hand truck can begin cooperating with the load to facilitate its transport.

It is the purpose of this invention to address these problems. Accordingly, a modified frame is disclosed with a novel structure that optimize the cooperation between the carrying platform and the wheels in order to produce the maximum lifting force possible for the operator. In addition, because the invention minimizes the impact of the size of the wheels on the lifting action, it is possible to use large wheels and thus improve the rideability and stability of the truck.

BRIEF SUMMARY OF THE INVENTION

One objective of this invention is the optimization of the leverage applied to an object being loaded onto a hand truck by the force exerted by the operator on the truck's handles. This leverage is maximized by making the point of contact between the load and the ground the fulcrum of the lever, so that the load is tilted rather than lifted.

Another purpose of this invention is the ability to remove the load directly from a pallet or a raised platform without first placing it on the ground. Similarly, it is the ability to place such a load directly from the hand truck to an elevated horizon. This is achieved by the same tilting mechanism mentioned above.

Another objective of the invention is the improvement of the riding quality of the hand truck over variable terrain. This is attained by fitting the invention with large wheels that can roll over rough surfaces and small objects without affecting the stability of the load. Such large wheels do not change the lifting characteristics of the truck because of a novel and unique system for loading the weight on the frame of the apparatus.

A further goal of the invention is the ability to load and securely transport objects of variable size. For that purpose, the device described herein is equipped with an adjustable retaining mechanism that can clamp and securely attach to the platform of the truck any load that is expected to be handled by this type of equipment.

Yet another objective of this invention is the realization of the above mentioned goals in an economical and commercially viable manner. This is done by utilizing simple components that are either already available in the open market or can be produced at competitive prices.

Various other purposes and advantages of this invention will become clear from its description in the specifications that follow, and from the novel features particularly pointed out in the appended claims. Therefore, to the accomplishment of the objectives described above, this invention consists of the features hereinafter illustrated in the drawings and examples, fully described in the detailed description of the preferred embodiment and particularly pointed out in the claims. However, such drawings and description disclose but one of the various ways in which the invention may be practiced.

BRIEF DESCRIPTION OF THE DRAWINGS

FIG. 1 illustrates a frontal view of the hand truck according to this invention and a phantom line view of a barrel mounted on it.

FIG. 2 illustrates a side view of the same embodiment of the invention in a rest position after a barrel, shown by phantom lines, is mounted on it; a cut-off view of a portion of the left wheel is also shown.

FIG. 3 illustrates a side view of the same assembly shown in FIG. 2 after the barrel has been tilted from its rest position on the floor.

DETAILED DESCRIPTION OF THE INVENTION

Figure 4:
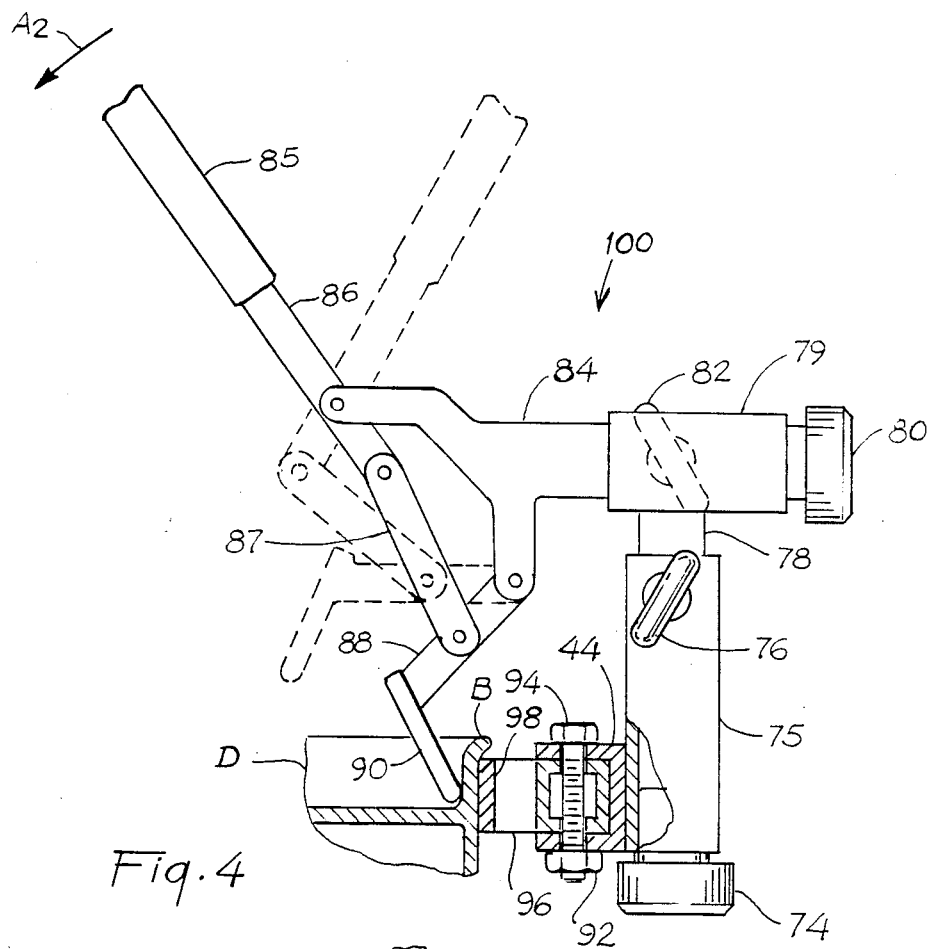
FIG. 4 illustrates a side view of the clamp mechanism used in the same embodiment of the invention to secure a barrel to the carrying platform of the hand truck.

The heart of this invention lies in the novel structural relationship between the frame and the wheels of the hand truck. All prior devices have wheels in rigid structural relationship to the carrying platform, so that the position of the wheels is fixed with respect to the position of the object tied to the platform. The result is that no adjustment of the pivot point of leverage is available to accommodate the different sizes and weights loaded. Therefore, each piece of equipment represents a compromise between maximum leverage, obtained by placing very small wheels with their axle as close as possible to the point of contact of the load and the floor, and maneuverability, optimized by large wheels that necessarily result in a higher axle and therefore a fulcrum point away from its ideal location.

The only device in the prior art that attempts to address these problems is the dolly disclosed in the Morissette patent referenced above. That hand truck is designed with wheels that are slightly off the ground when it rests in a vertical position against the load on supporting feet provided for that purpose. Thus, initially the load is not lifted by pulling on the handles of the dolly, but rather it is tilted around the pivot point of contact between the floor and the load itself. As the tilting motion progresses, the wheels, which are rigidly affixed to the frame, finally touch the ground and create a new pivot point around their axle. From that point on, the tilting action ends and the lifting action begins.

One problem with the Morissette invention is that it provides no flexibility in apportioning the tilting and lifting as the handles of the truck are pulled from the vertical to an approximately horizontal position. Therefore, the usefulness of the device varies with the size and shape of the load being transported. The lower the center of gravity of the load, the more tilting action is required for maximum benefit to be available to the operator. Instead, the fixed position of the wheels, which determine the scope of the tilting action, represents a compromise in the device based on the average load expected to be carried. It is exactly this limitation that the present invention overcomes. In addition, because of its mechanical configuration, this invention also makes it possible to have large wheels to produce a smoother all terrain ride, thus correcting another limitation of the Morissette device and of all other hand trucks known today.

Referring to FIG. 1, a front view of the preferred embodiment of this invention 10 is shown, including the phantom line view of a hypothetical drum D attached to it in a rest position. FIG. 2 illustrates a side view of the same assembly. The frame of the hand truck 10 consists of two separate components that cooperate mechanically by virtue of being slideably connected along their respective connecting members 20 and 50. The first frame component, which shall be referred to as the platform assembly, comprises the carrying platform to which the drum D is secured at its top edge by a clamp assembly 100 and at the bottom by a drum supporting saddle 24. This part of the frame, preferably of tubular construction, includes two support blocks 26 to which the saddle 24 is braced and two supporting beams 28 attached to blocks 26 through locking bolts 42 and extending upward to form the main portion of the truck's carrying platform. Two extension beams 30 are slideably mounted on beams 28 for adjustment of the length of said platform. A transverse brace 44 solidly connects beams 30 to form a one piece unit that can slide up and down beams 28 to either lengthen or shorten the overall size of the platform. Adjustably screwed bolts 40 on extension beams 30 permit their rigid connection to beams 28 at the desired length. Similarly, handle bar extension beams 32 are slideably connected to beams 30 and held in place by adjustably screwed bolts 38. Beams 32 are attached to a handle bar 36, which is equipped with handles 34 for the operator's convenience. By adjusting the placement of beams 32 in and out of the supporting beams 30, the overall length of the platform and handle bar unit is set and, correspondingly, the leverage available to the operator by applying force to the handle bar 36 is determined. Finally, this platform assembly includes two connecting sleeves 20, firmly affixed to beams 28 by welded or equivalently strong joints 46; these sleeves provide the coupling and mechanical cooperation of the platform assembly with the second component of this invention's frame, described below and referred to as the wheel assembly.

Figure 5:
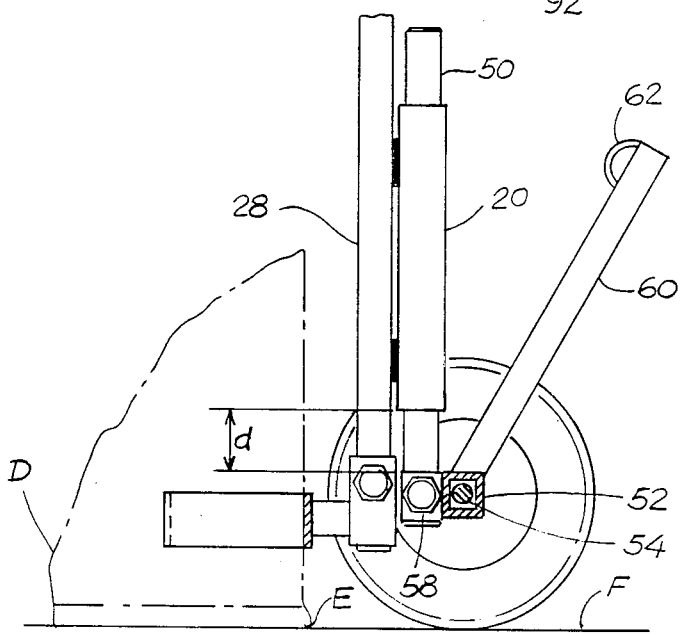
FIG. 5 illustrates a detailed side view of the same embodiment taken from line 5—5 in FIG. 1.

Turning now to the wheel assembly, as more particularly shown in FIG. 5, it consists of a transverse support member 52 that provides a housing for an axle 54 on which two wheels 56 are rotatably mounted. Two support blocks 58 are welded or otherwise rigidly attached to member 52 and support two beams 50 that extend in fork-like manner upwardly when the hand truck is in the vertical position. These beams 50 provide the union with the platform assembly by being slideably inserted into the sleeves 20. Thus, the wheels 56 and their axle 54 are free to move with respect to the platform assembly by virtue of the sliding motion of the connecting beams 50 in and out of the sleeves 20. This relative freedom of motion is the characteristic that gives this invention the loading and unloading advantages described herein. Finally, the wheel assembly includes a foot lever 60 and foot pedal 62, rigidly connected to the center of the axle housing 52, for increasing the operator's leverage in tilting and lifting the load attached to the platform assembly.

Referring to FIG. 4, a detailed illustration of the construction and operation of the clamp assembly 100 is shown. Mounted forwardly on bracket 44 for convenient access to the load being transported, this assembly is designed particularly to clamp and securely hold in place barrels and drums of different types and sizes. It consists of a stationary jaw 98, shaped like a saddle to fit the outer contour of the drum, mounted on a pair of braces 96 that are attached to and project forwardly from bracket 44 of the hand truck's frame. A clamping jaw 90 is attached to a system of levers 88, 87, 86 and a handle 85 comprising a standard toggle clamp for gripping material in cooperation with the stationary clamp 98. The clamping action of the clamping jaw 90 is adjustable horizontally by sliding the toggle assembly's frame 84 telescopically forward and backward in the horizontal support housing 79 by rotating the adjustment screw 80. A locking screw 82 is also provided for safety. Similarly, the clamping action of the clamping jaw 90 is adjustable vertically by sliding the support member 78, integrally constructed with the housing 79, telescopically up and down in the vertical support housing 75. A rotatably adjusting screw 74 and a safety locking screw 76 are also provided. In this particular embodiment, the support housing 75 is connected to bracket 44 by a bolt and nut combination 94 and 92.

Looking now at the functioning of the preferred embodiment of this invention, the steps required to transport drum D are described in order of operational sequence. The hand truck is initially positioned vertically adjacent to the drum D, with the saddle 24 at rest on the supporting floor F. By releasing bolts 40, beams 30 are allowed to collapse over beams 28 and to lower the upper portion of the frame to a point where the jaws of the clamp assembly 100 rest at some chosen distance d, not shown in the figures, below the top of the drum D. As will become more apparent from the description that follows, this distance is chosen by the operator to optimize the tilting and lifting characteristics of this device as a function of the location of the center of gravity of the load being handled. After tightening bolts 40 to lock the relative position of beams 28 and 30, the clamp assembly 100 is raised, as indicated by arrows A1 in FIG. 2, to reach the correct height for applying it to the top bead B of the drum D. As a result of this repositioning of the clamp assembly, the entire platform assembly moves upward with respect to the wheel assembly by allowing the beams 50 to slide down in sleeves 20 as the platform assembly is raised to the desired position. By virtue of this relative repositioning, the wheels 56 remain on the floor and the sleeves 20 become raised with respect to their rest position by the same distance d traveled by the original repositioning of the clamp assembly to reach the drum's top bead. This distance d is shown in FIG. 5.

As more particularly illustrated in FIG. 4, the bead B of the drum D is clamped by positioning the stationary jaw 98 of the clamp assembly 100 under its outer perimeter and by forcing the clamping jaw 90 to clamp it in place by pressure exerted on the bead's inner perimeter. By applying force on the handle 85 of the lever 86 in the direction shown by arrow A2, the operator can snap the toggle clamp mechanism in place and achieve a permanent grip on the drum's bead. Once so clamped, the drum is securely fastened to the platform assembly of the hand truck and it can safely be tilted and lifted without risk to the operator. By pulling the handle 85 in the opposite direction, the toggle mechanism is snapped open and the drum's bead is released from the clamp's grip.

Once the drum is so fastened to the platform assembly, the operator can load it on the hand truck by pulling the handles 34 in the direction shown by arrow A3 in FIGS. 4 and 5. By adjusting the extension of members 32 from the unit, the operator can change the leverage exerted and conform it to the requirements of the weight being handled and of his or her height. As the platform assembly and the drum fastened to it begin moving backward, the coupling beams 50 of the wheel assembly are free to slide into and through the coupling sleeves 20, thus allowing the wheels 56 to roll toward the operator and to present no impediment to the free tilting of the drum. In fact, the fulcrum of the leverage applied by the operator is the point of contact between